(12) United States Patent
Froggatt (10) Patent No.: US 7,330,245 B2
(45) Date of Patent: Feb. 12, 2008

(54) CALCULATION OF BIREFRINGENCE IN A WAVEGUIDE BASED ON RAYLEIGH SCATTER

(75) Inventor: Mark E. Froggatt, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 0 days.

(21) Appl. No.: 11/371,229

(22) Filed: Mar. 9, 2006

(65) Prior Publication Data

US 2006/0204165 A1 Sep. 14, 2006

Related U.S. Application Data

(60) Provisional application No. 60/659,905, filed on Mar. 10, 2005.

(51) Int. Cl.
*G01N 21/00* (2006.01)

(52) U.S. Cl. .................................. 356/73.1

(58) Field of Classification Search ...................... None
See application file for complete search history.

(56) References Cited

U.S. PATENT DOCUMENTS

| 5,317,147 | A | * | 5/1994 | Dandliker et al. ..... 250/227.17 |
| 6,097,488 | A | * | 8/2000 | Grek et al. ................. 356/364 |
| 6,229,599 | B1 | * | 5/2001 | Galtarossa ................. 356/73.1 |
| 6,545,760 | B1 | | 4/2003 | Froggatt et al. |

OTHER PUBLICATIONS

Huttner et al ("Local Birefringence Measurements in Single-Mode Fibers with Coherent Optical Frequency Domain Reflectometry", IEEE Phonics Technology Letter, vol. 10, No. 10, Oct. 1998).*
Related U.S. Appl. No. 11/062,740, filed Feb. 23, 2006; Inventors: Froggatt et al.
Limberger et al.; "OLCR Characterization of Efficient Bragg Gratings in Optical Fiber;" SPIE vol. 2044; pp. 272-283, no date.
Wayne V. Sorin; "High Resolution Optical Fiber Reflectometry Techniques;" SPIE vol. 1797 Distributed and Multiplexed Fiber Optic Sensors II (1992); pp. 109-118.
Related U.S. Appl. No. 60/814,088, filed Jun. 16, 2006.
Related U.S. Appl. No. 11/808,260, filed Jun. 7, 2007.

* cited by examiner

*Primary Examiner*—Tu T Nguyen
(74) *Attorney, Agent, or Firm*—Nixon & Vanderhye P.C.

(57) ABSTRACT

Light is coupled into two polarization modes of a waveguide, e.g., an optical fiber. The spectral response of Rayleigh backscatter in the waveguide segment for the two polarization modes is measured, e.g., using OFDR, OTDR, OLCR, etc. The autocorrelation of the spectral response is calculated. The spectral (wavelength) shift from a main autocorrelation peak to a side autocorrelation peak, corresponding to one of the two polarization modes of the waveguide segment, is determined. The spectral shift, corresponding to a beat length of the waveguide segment, is multiplied by an average index of refraction to determine a birefringence of the waveguide segment.

30 Claims, 8 Drawing Sheets

CALCULATION OF BIREFRINGENCE IN A WAVEGUIDE BASED ON RAYLEIGH SCATTER

CLAIM OF BENEFIT OF PROVISIONAL PATENT APPLICATION

Priority is claimed from U.S. Provisional Patent Application No. 60/659,905 filed on Mar. 10, 2005. The contents of this provisional application are incorporated by reference.

RELATED APPLICATIONS

This patent application is related to pending U.S. patent application Ser. No. 11/062,740 entitled, "Identifying Optical Fiber Segments And Determining Characteristics Of An Optical Device Under Test Based On Fiber Segment Scatter Pattern Data," to Froggatt et al.

TECHNICAL FIELD

The technical field relates to optical measurements, and more particularly, to determining birefringence of a waveguide such as an optical fiber or other optical device.

BACKGROUND AND SUMMARY

Mixing between a reference signal and a data signal is often necessary to extract information about an optical device or network. A probe signal and a reference signal originating from the same source are typically mixed, resulting in fringes that can be detected and used to assess information about the device being probed. In interferometric sensing, a reference signal is mixed with a signal whose phase and/or amplitude is modified by a parameter to be measured. The mixing produces an interference signal, and the amplitude of the interference signal depends on how efficiently the two optical signals mix.

Optical Time-Domain Reflectometry (OTDR) is a widely used tool for identifying problems in large optical networks. OTDR instruments provide measurements of the level of scatter present in a section of fiber, or at a discrete interface over long distances. Optical Frequency Domain Reflectometry (OFDR) may be used to provide data similar to that provided by OTDR over shorter ranges (tens of meters for OFDR instead of 1000's of meters for OTDR) and higher resolutions (tens of microns for OFDR instead of tenths of meters for OTDR). This change in distance scale allows OFDR to be used in applications where the dimensions of interest are centimeters instead of meters such as when optical coupler and switch networks are constructed. For example, OFDR may be used in module-level and sub-module-level diagnostics. The above-identified related application explains how an OFDR can be used to measure the complex spectral reflectivity of Rayleigh backscatter as a function of fiber length and how that can be very useful in a number of applications.

Scatter is the process of redirecting the propagation of light. In an optical fiber, this occurs when light encounters a change in the geometry of the fiber core, or a change in the local index of refraction of a fiber. Scatter generally occurs at any interface such as connectors, poor splices, collimating optics, etc. Typically, light scattered from the forward propagating direction into the backward propagating direction is of primary concern and is called a reflection. Rayleigh scatter, in the context of optical fiber, describes the light scattered in the fiber due to the random nature of the glass structure in and around the fiber core. Although Rayleigh scatter is random in nature, it is fixed because the random pattern of the glass structure is "frozen" into the fiber. Scatter is a form of loss, and loss is the removal of light from the intended propagating mode.

Figure 1:
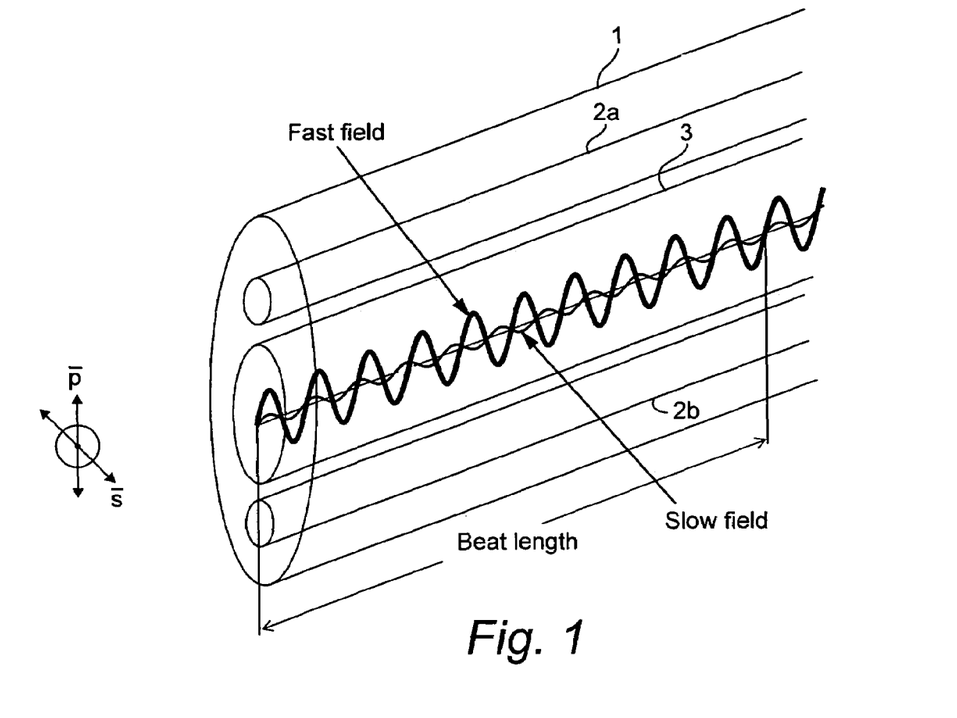
FIG. 1 illustrates beat length in an optical fiber.

Bragg gratings have been used to measure the "beat length" (which is different from "beat frequency") of a polarization maintaining (PM) fiber. FIG. 1 conceptually illustrates beat length. A polarization maintaining (PM) optical fiber 1 includes two stress rods 2a and 2b and a waveguide core 3. Light propagating along the core 3 includes two perpendicular polarization vectors, commonly labeled "p" and "s". These perpendicular polarization vectors correspond to two perpendicular electromagnetic (EM) fields (only the electric fields are illustrated to simplify the figure and demonstrate the principle). To be a PM fiber, coupling between the two EM fields needs to be minimized so that energy from one polarization/field "mode" is not transferred to the other polarization/field "mode". That mode coupling decreases as a phase velocity difference between the two polarizations/fields increases. Phase velocity is described in more detail below.

The stress rods 2a and 2b, which have a different thermal coefficient and index of refraction than the core 3, create a phase velocity difference between the two polarizations/fields. The "fast" electric field shown as the thicker sine wave corresponds to a "fast mode," and the "slow" electric field shown as the thinner sine wave corresponds to a "slow mode." The fast mode and slow mode light waves have different phase velocities. The light in the fast mode will have a longer wavelength than the light in the slow mode. As a result, the two electric fields change in phase relative to another as they propagate down the fiber. The two fields start in phase, and then after changing phase by 360 degrees over a certain distance along the fiber, they are back in phase. The distance over which this phase realignment takes place is the "beat length."

Figure 2:
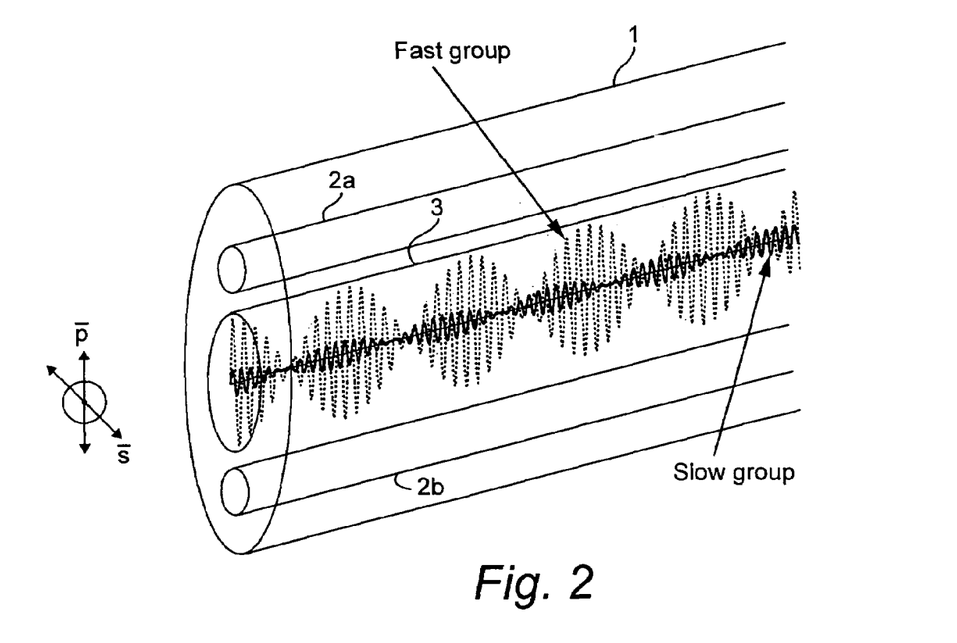
FIG. 2 illustrates beat notes propagating down a fiber at different group velocities.

The beat length is a useful parameter to measure for a PM fiber or other optical device because it represents the degree of polarization coupling, (which is usually undesirable), in that PM fiber. A shorter beat length means less mode coupling and a better PM fiber. But beat length should not be confused with a difference in group velocities. As shown in FIG. 2, when two closely spaced wavelengths are present, they form "beat-notes" in each of the modes of the PM fiber corresponding to the envelope waveforms as opposed to the underlying higher frequency waveforms that create the envelopes. The slow and fast envelopes propagate down the fiber at different group velocities. These group velocities can be substantially different from the phase velocities that create the beat length.

Birefringence and beat length are related, and one can be readily calculated from the other. For purposes of this description, the birefringence is used to describe the property to be determined for a PM fiber. A birefringent material causes different light polarization modes to travel at different speeds through the birefringent material, and birefringence is the degree to which a light wave with two polarizations is split into two unequally reflected or transmitted waves when it travels through a birefringent material. More formally, birefringence, Δn, is given by:

$$n_{slow} - n_{fast} = \Delta n \tag{1}$$

where $n_{slow}$ and $n_{fast}$ are the refractive indices for the slow and fast propagation modes, respectively. The beat length d is related to birefringence in accordance with the following:

$$d = \frac{\lambda}{n_{slow} - n_{fast}} \quad (2)$$

where λ is the nominal operating wavelength (in a vacuum), e.g., a center wavelength of operation of system where the PM fiber is incorporated or the design wavelength of the fiber.

Figure 3:
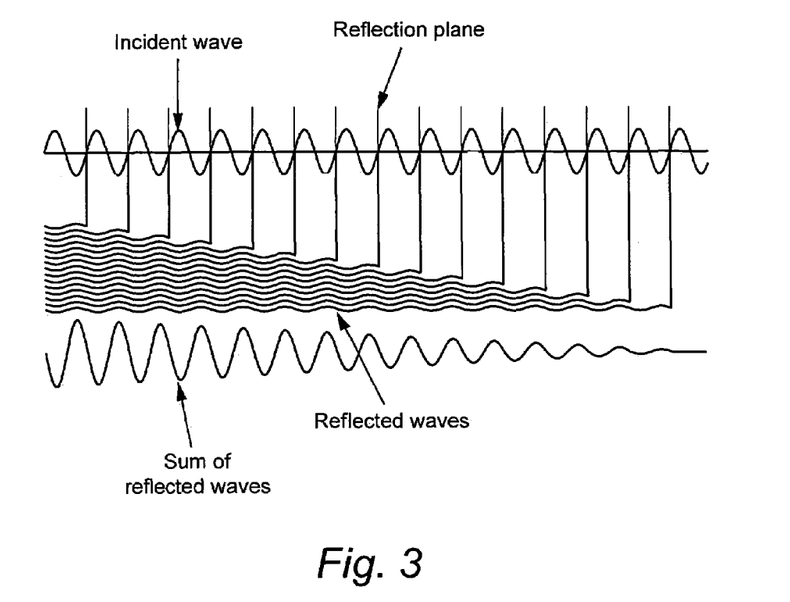
FIG. 3 illustrates resonant reflection of a light wave from a periodic reflector like a Bragg grating.

A Bragg grating can be used to measure birefringence. It is a periodic reflector made up of periodically spaced zones physically formed in or on a section of fiber. The spacing is determined to have a refractive index slightly higher than the fiber core. That spacing reflects a narrow range of wavelengths while transmitting others. FIG. 3 shows conceptually a resonant reflection of a light wave from a Bragg grating. The amplitude of the sum of reflected waves changes linearly with the number of reflections. The frequency of reflection is related to the phase velocity of the transmitted light. The phase velocity of a wave is the rate at which the phase of the wave propagates in space. This is the velocity at which the phase of any one frequency component of the wave will propagate. In other words, one particular phase of the wave (for example the crest) travels at the phase velocity. (Recall that phase velocity and group velocity are different).

The two polarization modes of a PM fiber have different effective indices of refraction. Thus, they have different propagation constants within the fiber and have different peak reflection wavelengths. Because the electric fields in the two polarization modes have different wavelengths, the same reflector causes the two electric fields to reflect at different light frequencies.

Reflections in a fiber are naturally caused as a result of Rayleigh scatter. Rayleigh scatter in an optical fiber is a spatially distributed density function with little polarization dependence. Therefore, the random but fixed spectra, (i.e., the intensity of the scattering as a function of frequency), of PM fiber segments exhibit the same splitting of the spectra for the two polarization modes as observed with a Bragg grating. In the case of Rayleigh scatter, the splitting can determined using autocorrelation and cross-correlation functions of the measured reflected scatter. These functions can be determined by calculating the real-valued amplitude spectrum of a section of fiber and performing real-valued auto-and/or cross-correlations, or by multiplying the complex conjugate of measured complex reflection amplitude vs. fiber distance data obtained for a section of PM fiber using OFDR with another predetermined set of complex amplitude vs. distance data. The spectral separation of the calculated peaks is a measure of the local beat length of the fiber from which a measure of local fiber birefringence can be determined.

Based on these observation and determinations, the inventors determined a way to compute birefringence of a segment of a waveguide at a particular waveguide location by computing the autocorrelation of reflection spectrum associated with a particular location along the waveguide. To perform that calculation, an apparatus measures a complex response of a spectral reflection of the waveguide at a delay corresponding to the particular location along the waveguide. Non-limiting example apparatus include an OFDR or an optical low coherence reflectometer (OLCR). Then an autocorrelation function is determined using either of the methods just described, and the beirefringence is then calculated based on the distance between side and main autocorrelation peaks.

In an example where the waveguide is a PM fiber, light is coupled into two modes (fast and slow) of the PM fiber. The spectral response of the fiber segment which includes the two polarization modes is measured, e.g., using OFDR, OLCR, etc. The autocorrelation of the spectral response of a segment of fiber is then calculated. The spectral (wavelength) shift from the main autocorrelation peak to a side autocorrelation peak, corresponding to one of the two polarization modes of the PM fiber, is determined. The spectral shift or a percentage shift is multiplied by an average index of refraction to determine birefringence of the fiber segment.

Birefringence can be used to measure axial strain and/or temperature. Using Rayleigh scatter to determine birefringence rather than Bragg gratings offers significant advantages. First is reduced cost because Bragg gratings typically each cost hundreds of dollars. Second, the Rayleigh scatter measurement permits birefringence measurements at every location in the PM fiber, not just at predetermined locations. Freed from having to insert expensive gratings at specific measurement points along a fiber, many more measurement points may be used. Third, the process of physically "writing" a Bragg grating into optical fiber, in addition to being time consuming, often compromises the strength and integrity of the fiber. Those compromises are avoided using the Rayleigh scatter approach.

In one detailed example implementation, the reflected light intensity of a PM fiber as a result of Rayleigh scattering is measured using an OFDR or other swept laser system. The measured light intensities for the s and p polarization modes is preferably linearized using reference interferometer data. The linearized s and p light intensity data are then Fourier transformed into an array of complex data. The s and p complex data relating to a specific segment at a particular location along the fiber are extracted from the array. The extracted s and p data are Fourier transformed into the frequency domain, and the amplitude of the complex number at each point in the each of the s and p arrays is calculated. The vector sum of the two amplitude arrays is calculated to form a single amplitude spectrum, and the mean of the spectrum is removed. The autocorrelation of the amplitude spectrum is then determined resulting in a main autocorrelation peak and two side autocorrelation peaks for the s and p polarization modes. From the autocorrelation, the distance is determined from the center spectral peak to one of the s or p side peaks. The birefringence is then calculated for that location on the PM fiber based on the distance to the side peak.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Birefringence of a segment optical waveguide is determined using the Rayleigh scattered light from that segment. The basis for measuring bifringence in a PM optical fiber using Rayleigh scattering begins with a scattering function, σ(z). The light reflected by Rayleigh scattering includes the electric fields E for the fast and slow light polarization modes can be found using the following equations:

$$E_{slow}(k) = \int_{-\infty}^{\infty} \sigma(z) e^{i\frac{k}{n_{slow}}z} dz \quad (3)$$

and $$E_{fast}(k) = \int_{-\infty}^{\infty} \sigma(z) e^{i\frac{k}{n_{fast}}z} dz \quad (4)$$

where k is $$\frac{2\pi}{\lambda},$$

λ is the light wavelength, z is the distance along the fiber, and n is the index of refraction associated with a particular polarization.

Figure 4:
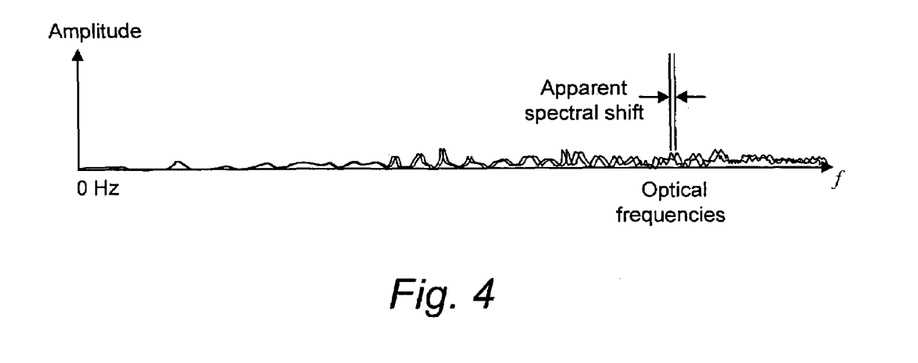
FIG. 4 is a graph showing that the spectrum reflected from the fast mode is a scaled version of the spectrum reflected from the slow mode, which at higher optical frequencies, appears as a spectral shift over small frequency ranges.

From equations (3) and (4), the scatter pattern σ(z) depends only on distance along the fiber (i.e., the scatter changes at different locations along the fiber) and not the polarization state of the incident light. Consequently, the spectrum reflected from the slow polarization mode is a scaled version of the spectrum reflected from the fast polarization mode. Scaled is another way of indicating that the fast and slow polarization modes will have the same reflected waveform shape, but shifted in frequency. For example, a waveform crest for the fast polarization mode will occur at frequency $f_1$, and the same waveform crest for the slow polarization mode will occur at frequency $f_1+\Delta$, where Δ is a small difference in frequency called a "shift". Since the scaling is proportional to frequency, beginning at zero hertz, the scaled scatter spectrum will appear as a shift at high (optical) frequencies and small frequency ranges. FIG. 4 illustrates the scaled spectral shift, where scaling over an entire frequency range looks like a frequency shift at high frequencies over small bands. That spectral shifting is used to determine birefringence as explained below.

Figure 5:
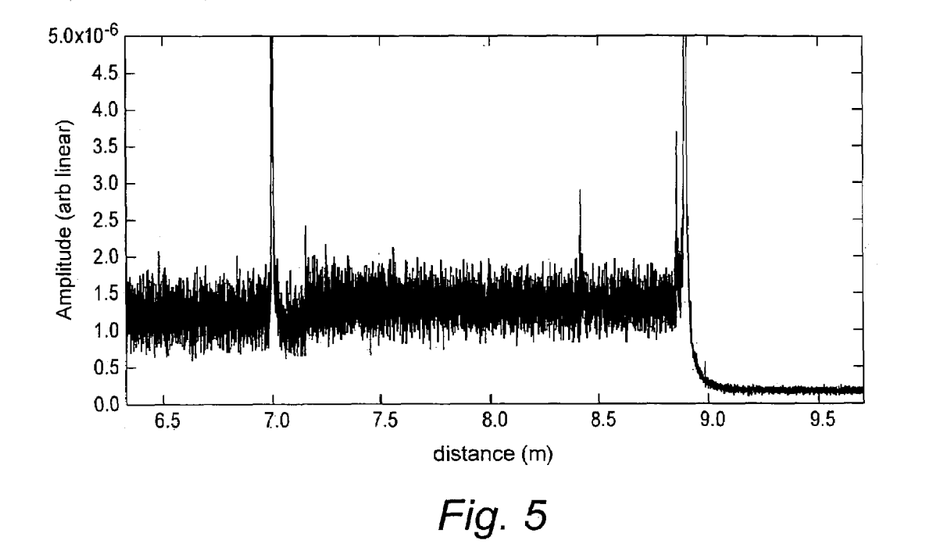
FIG. 5 is a graph plotting amplitude of measured back scatter of a section of HB PM fiber.

FIG. 5 illustrates this reflected light resulting from Rayleigh scattering in a section of HB (Highly Birefringent) PM fiber, i.e., from about 7.2 to 8.8 meters. The reflected backscatter is measured using an OFDR system with sufficient sensitivity with the amplitude of the scatter being plotted against the distance along the fiber. The PM fiber was spliced to a single mode (SM) fiber with a connector. The connector reflection is visible at 7.0 meters. Discrete large reflections occur at the beginning of the PM fiber section at around 7.2 m, at the end of the PM fiber at around 8.9 meters, and at a defect in the PM fiber at around 8.4 meters. Initially, one might expect to see the beat-frequency in the polarization resolved scatter data due to the rotation of the polarization vector as it propagates down the section of PM fiber. But this turns out to be the case only in the first few centimeters of the PM fiber, and following that, no beating can be observed in the PM fiber data. The fading of the polarization beat length is due to the loss of coherence of the two polarization modes as they travel down the fiber. As fast and slow mode light propagates further along the fiber, the differential delay between the modes becomes larger, and therefore, the Rayleigh scatter pattern that each mode encounters is shifted a particular distance with respect to the other mode.

Figure 6:
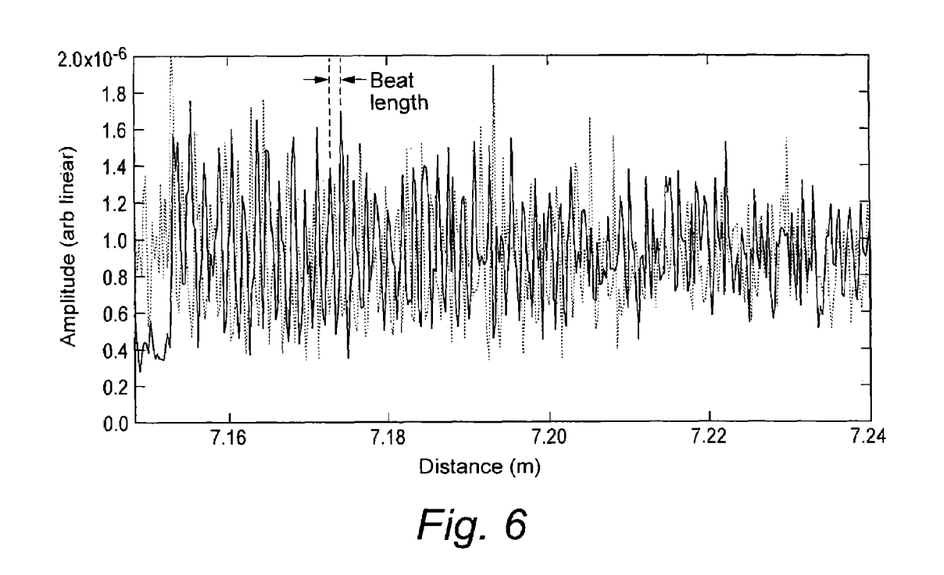
FIG. 6 is an enlarged portion of the graph from FIG. 5.

FIG. 6 is an enlarged view of the front part of the PM fiber (from 7.15-7.24 meters), with the two polarization modes shown—one as solid line and the other as a dotted line. The beat length of the fiber (labeled in the figure) can be seen in the oscillating scatter amplitudes near the front of the fiber. So simply trying to directly measure the beat length/birefringence is not practical—at least in a distributed or continuous fashion—along the length of a fiber segment.

But equations (3) and (4) describing the backscattered light point to another way to determine the local beat length. This local beat length/birefringence determination can be made by making use of the spectral shift (see the example in FIG. 4) between the light reflected from the fast and slow modes. The spectral shift can be observed by calculating the amplitude spectrum of the scatter from a section of fiber and then performing an autocorrelation.

Figure 7:
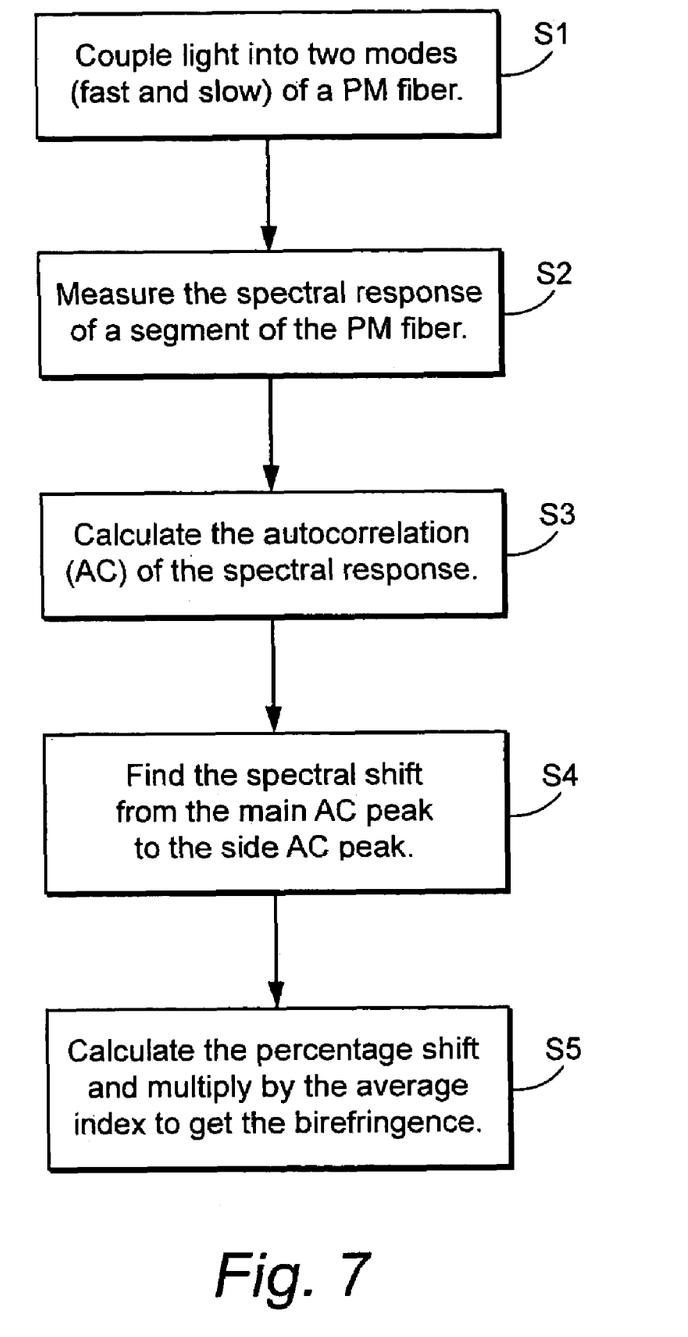
FIG. 7 is a flow chart illustrating example steps for determining birefringence of a fiber at a particular location on the fiber.

Consider the procedures for determining birefringence of a segment of PM fiber outlined in the flowchart of FIG. 7. Although PM fiber is used, these procedures may be applied to any waveguide or optical device. In an example where the waveguide or optical device is a PM fiber, light is coupled into two polarization modes (fast and slow) of the PM fiber (step S1). The spectral response of the fiber segment which includes the two polarization modes is measured (step S2), e.g., using OFDR, OLCR, OTDR, etc. The autocorrelation of the spectral response is then calculated (step S3). The spectral (wavelength) shift from the main autocorrelation peak to a side autocorrelation peak, corresponding to one of the two polarization modes of the PM fiber, is determined by measuring the distance, in frequency, from the main peak to the side peak (step S4). This distance corresponds to the beat length of the PM fiber segment. The spectral shift or a percentage shift is multiplied by an average index of refraction to determine birefringence of the fiber segment (step S5).

Figure 8:
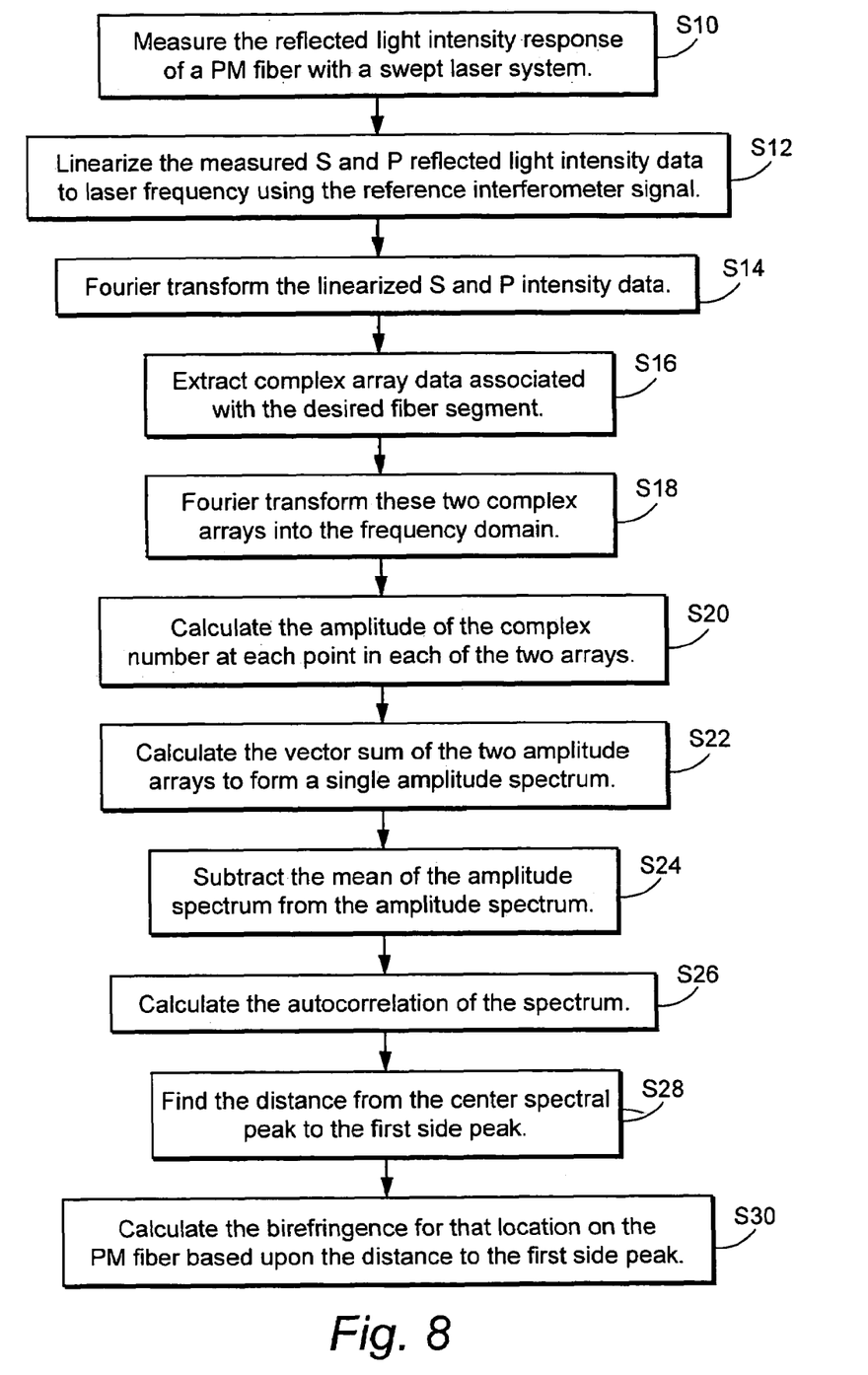
FIG. 8 is a flow chart illustrating more detailed but still example steps for determining birefringence of a fiber at a particular location on the fiber.

FIG. 8 is a flow chart illustrating example steps for one non-limiting implementation. The reflected light intensity response of a PM fiber is measured using an OFDR or other swept laser system (step S10). For each fiber segment, the tunable laser 20 is swept through a range of frequencies/wavelengths, and corresponding light intensity signals as a function of frequency/wavelength are obtained for both the s and p polarization modes. The light intensity at a particular frequency/wavelength is sometimes called a fringe. The light intensity signal is converted into an electrical time varying signal.

The measured light intensities for the s and p polarization modes are preferably linearized using reference interferometer data (step S12). The linearized s and p light intensity data are then Fourier-transformed into an array of complex data in the frequency domain that defines a scatter pattern for that fiber segment (step S14). The scatter pattern is preferably stored in memory for subsequent operations. The s and p complex data relating to a specific segment at a particular location along the fiber are extracted from the array (step S16). The extracted s and p data are Fourier transformed into the frequency domain (step S18), and the amplitude of the complex number at each point in the each of the s and p arrays is calculated (step S20). The vector sum of the two s and p amplitude arrays is calculated to form a single amplitude spectrum (step S22). The mean amplitude introduces an offset to the later calculated autocorrelation. If the data set is finite, (and it usually is), the mean of the signals produces a triangularly-shaped bias or offset on the resulting correlation. This bias adds no information, and makes it more difficult to easily discern the peak marking where the two lists match. The mean of the spectrum is therefore preferably removed (step S24). The autocorrelation of the amplitude spectrum is then determined resulting in a main autocorrelation peak and two side autocorrelation peaks for the s and p polarization modes (step S26). From the autocorrelation, the distance is determined from the center spectral peak to one of the s or p side peaks (step S28). The birefringence is then calculated for that location on the PM fiber based on the distance to the side peak (step S30).

Figure 9:
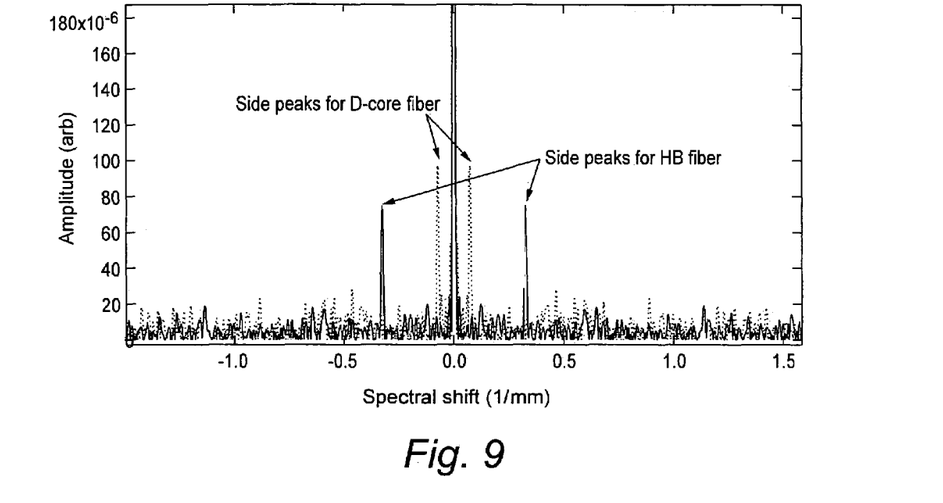
FIG. 9 is a graph of autocorrelation functions for a section of D-core and HB fiber.

The procedures in FIG. 8 were applied to an example 3 cm segment of High Birefringence (HB) fiber section (a HB fiber is a higher quality PM fiber) and for a 3 cm segment of D-core fiber. A D-core fiber does not use stress rods, and thus, has a much lower birefringence than HB fiber, i.e., it is less polarization maintaining. First, a complex array of numbers describing the measured scatter of the two detected polarization states s and p (which can be different from the slow and fast modes) is zero padded to a length with a radix-2 number of entries, e.g., $2^{16}$ or more. Zero padding is done to achieve to a radix-2 number so that efficient Fast Fourier Transform (FFT) algorithms that require arrays with a radix 2 length can be used to compute the spectrum. The total length of the zero padding is determined by the desired degree of spectral resolution one wants with regard to the position of the autocorrelation peaks. These zero padded arrays are then converted to the spectral domain using an inverse Fourier transform. Next, the amplitudes of these arrays are found, and then vectorially summed to form the amplitude of the spectrum. The average of the spectrum is subtracted off, and a non-circular autocorrelation is then calculated. Example autocorrelations calculated for the 3 cm of High Birefringence fiber and for a 3 cm segment of D core fiber are shown in FIG. 9.

The autocorrelation amplitude is plotted against spatial frequency shift (measured in units of 1/mm) which again from FIG. 4, is the distance between the same point (e.g., a particular waveform crest) in the s and p polarization Rayleigh reflection waveforms. The beat length of the HB fiber is the distance from the center autocorrelation peak at 0.0 and one of the side autocorrelation peaks at about 0.35 spectral shift from 0.0. The beat length of the D-core fiber is the distance from the center autocorrelation peak at 0.0 and one of the side autocorrelation peaks at about 0.10 spectral shift from 0.0. The shorter beat length confirms that the HB fiber is more birefringent than the D-core fiber. The beat length is converted to birefringence using equation (1). Thus, the side peaks are a direct measurement of the fiber birefringence at that particular 3 cm section for both types of fiber.

Figure 10:
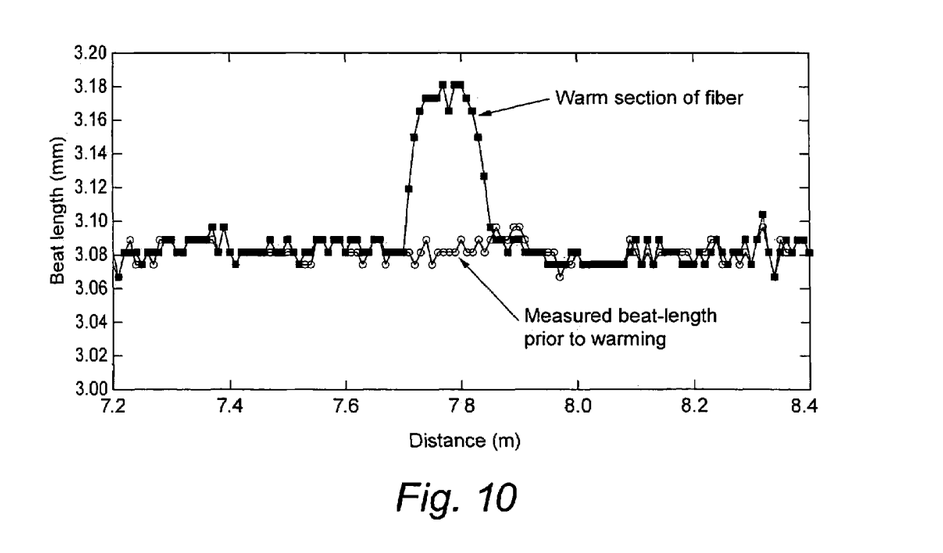
FIG. 10 is a graph of beat length as a function of distance along a section of HB PM fiber.

Calculating the spectral autocorrelation at different locations along a length of PM fiber provides a distributed measure of the birefringence of the fiber. While such a measurement is useful to determine PM fiber beat length, it is also in areas of sensing and assessing PM fiber alignment. FIG. 10 is a plot of the birefringence, shown as local beat length, as a function of length over 1.2 meters. The fiber relies upon thermal stresses to induce birefringence, and thus, the birefringence is sensitive to temperature changes. To demonstrate the distributed nature of the measurement, one section of that fiber segment was heated, and the birefringence measured again. The increased beat length as a result of the increased temperature is apparent and readily detected using the Rayleigh scatter measurement approach.

Figure 11:
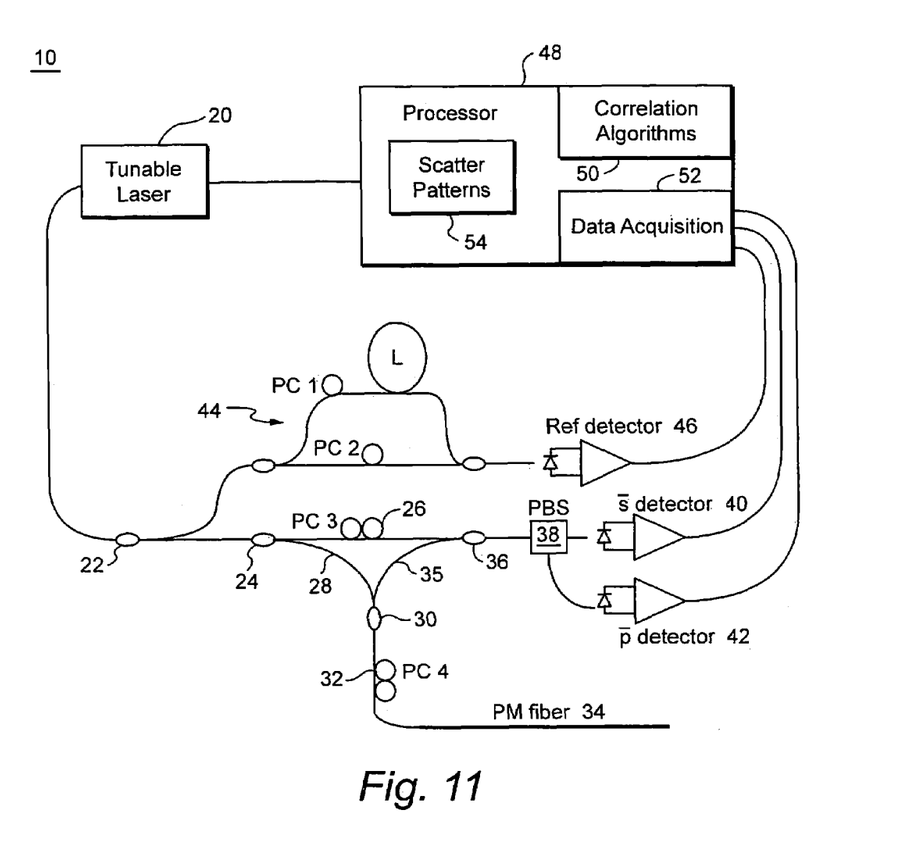
FIG. 11 illustrates an example OFDR-based apparatus for implementing the steps in either FIG. 7 or 8.

Various different light reflectometers may be used to determine beat length/birefringence at any location along a fiber based on Rayleigh backscatter patterns. FIG. 11 shows an example OFDR based system 10 for determining beat length/birefringence at any location along a fiber based on Rayleigh backscatter patterns. A tunable laser 20 is scanned through a range of frequencies or wavelengths. The laser light is preferably provided to splitter 22 which divides the laser light into two paths. The first desirable (but still optional) path is to a laser linearization interferometer 44 that includes a first longer path and a second shorter path with polarization controllers PC1 and PC2. These polarization controllers ensure that the light in the two different paths interferes. The light is combined and detected by an optical-to-electrical reference detector 46 and then provided to the processor/acquisition unit 44 in order to associate DUT optical intensity signals with a corresponding frequency/wavelength. One example laser linearization process is described in detail in U.S. Pat. No. 6,856,400, the contents of which are incorporated here by reference.

The second path from splitter 22 routes the laser light to splitter 24, which splits the light into a reference path including polarization controller PC3 26, which splits the reference light evenly between the s and p states, and a device under test (DUT) input path 28—in this case a PM fiber 34. The DUT input light is input to the DUT fiber 34 via a coupler 30 and polarization controller PC4 32. Polarization controller 32 is adjusted to ensure there is light in both the fast and slow polarization modes. The back-scattered light from the DUT 34 is passed via PC4, coupler 30, and fiber 35 for coherent combination with the reference path light at combiner 36. The combined reference and DUT fiber back scatter signal is divided into the s and p polarizations by the polarization beam splitter (PBS) 38. The two backscatter polarization signals are detected at respective s and p optical-to-electrical detectors 40 and 42 and provided to the data acquisition unit 52 of processor 48 for processing.

The processing unit 44 includes a memory 50 that contains one or more algorithms for implementing equations (1)-(4) and the procedures in the flowcharts described above. Detected optical signals are processed to produce a "scatter pattern" for individual fiber segments or other optical components. One example scatter pattern is a Rayleigh scatter pattern. One or more scatter patterns used for autocorrelations for different fiber segments or other optical devices are stored in the scatter pattern memory 54.

Figure 12:
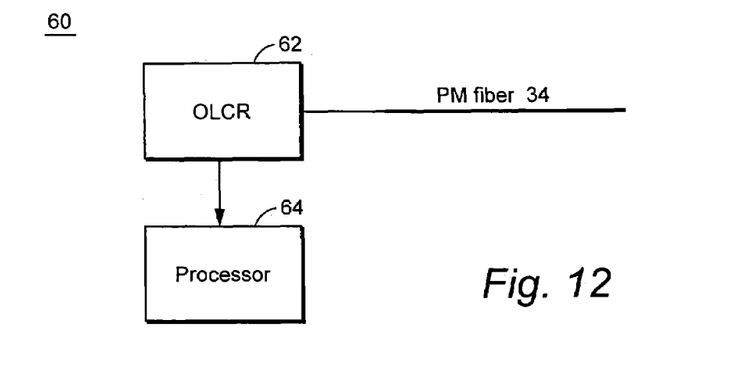
FIG. 12 illustrates an example OLCR-based apparatus for implementing the steps in either FIG. 7 or 8.

FIG. 12 shows another example embodiment 60 using an OLCR 62 coupled to a processor 62. In Optical Low Coherence Reflectometry, a broadband source is used, and the reference delay in the optics is varied. When the reference delay and the delay to the DUT match to within the coherence length of the source (which is short) interference occurs. For more details regarding OLCR, see, for example, H. G. Limberger P. Y. Fonjallaz, P. Lambelet, and R. P. Salathe, "OLCR Characterization of Efficient Bragg Gratings in Optical Fiber," SPIE, Vol 2044, pp 272-283

Because PM fiber establishes two well-defined propagation states in the fiber that do not readily transfer power, (thus the polarization maintaining aspect of the fiber), polarization diversity detection, as performed by the PBS and the s and p detectors is not a necessity. If light is launched at 45 degrees to the birefringenent axis in the fiber, then similar levels of light will propagate in each mode of the fiber. Because the modes do not couple, there will be no polarization fading in the reflected light. The polarization of the reference light can then be adjusted to also be 45 degrees. The measured interference signal will then contain information from both propagating states, and will not display polarization fading. This is important because the polarization beam splitter is an expensive (>$500) item as well as a potential source of stray reflections in the optical network. Further, an entire data channel is eliminated, reducing cost, improving speed, and allowing more efficient multi-channel operation.

Figure 13:
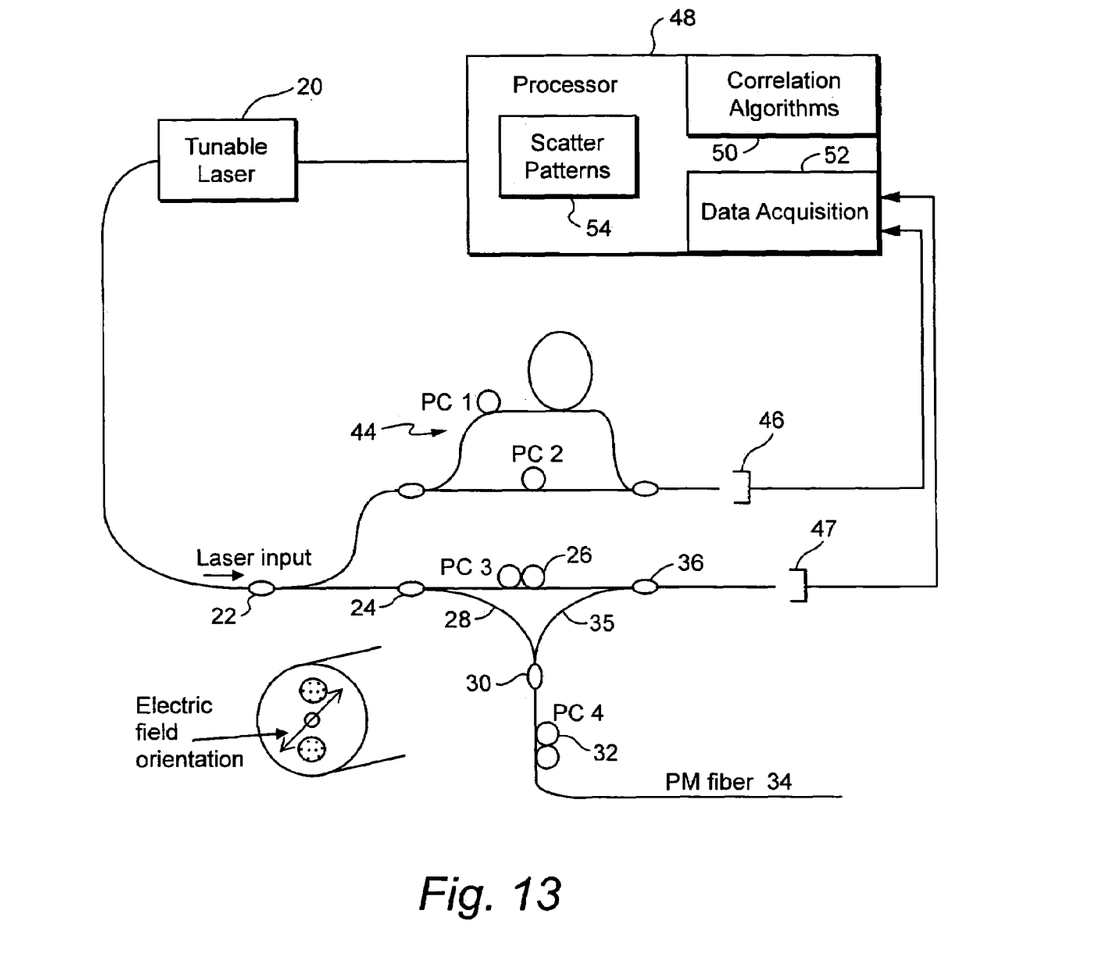
FIG. 13 illustrates an example OFDR-based apparatus for implementing the steps in either FIG. 7 or 8 that does not require a polarization beam splitter and both s and p detectors.

An example of an OFDR network that measures PM fiber without a polarization beam-splitter or two s and p detectors is shown in FIG. 13. Instead of using a polarization beam-splitter, light is launched at 45 degrees to the birefringent axis in the fiber, corresponding to the axis intersecting the two stress rods using PC 4. As a result, similar levels of light will propagate in each mode of the fiber. Rotating the two paddles of the polarization controller PC 4 until the side peaks are maximized ensures that a substantial portion (e.g., more than 10%) of the optical power is launched in each of the two polarization modes of the PM fiber. The polarization controller PC 3 is adjusted (paddles are rotated) to set the polarization state of the reference field such that it is not orthogonal to either polarization mode of the PM fiber (i.e., both states are detected) and the side peaks are maximized. The adjustments to PC4 are repeated until the side-peak height is satisfactory.

The reflected light can be detected using only one light intensity detector 47. In this non-limiting example embodiment, no vector sum is required. The processing otherwise is the same as described above. A segment of complex numbers associated with the location of interest is extracted, transformed back to the frequency domain, its amplitude determined, and an autocorrelation performed.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for determining birefringence of a waveguide segment at a particular location along the waveguide, where the waveguide has plural polarization modes, the method comprising:
    coupling light into the plural polarization modes of the waveguide so that the light propagates along the plural polarization modes of the waveguide;
    detecting scatter reflections associated with the waveguide segment;
    generating back scatter data associated with the detected scatter reflections;
    computing an autocorrelation of the back scatter data;
    determining the birefringence of the waveguide segment at the particular location along the waveguide based on the computed autocorrelation; and
    using the determined birefringence to characterize the waveguide segment.

2. The method in claim 1, further comprising:
    using Optical Frequency Domain Reflectometry (OFDR) to obtain the back scatter data, and
    storing the back scatter data in memory.

3. The method in claim 1, further comprising:
    determining a distance from a main peak of the autocorrelation and a side peak of the autocorrelation,
    wherein the side peak of the autocorrelation corresponds to one of plural polarization modes associated with light back scattered from the waveguide segment.

4. The method in claim 3, wherein the distance corresponds to a beat length of the waveguide segment, and
    wherein the birefringence is determined based on the beat length.

5. The method in claim 1, further comprising:
    scanning the waveguide with a tunable laser,
    wherein light from the laser is reflected as a result of Rayleigh scattering in the waveguide and corresponds to the scatter reflections.

6. The method in claim 5, further comprising:
    linearizing the back scatter data to compensate for non-linearity in the scanning.

7. The method in claim 5 performed using an OFDR including a polarization beam splitter and plural polarization back scatter intensity detectors.

8. The method in claim 5 performed using an OFDR without a polarization beam splitter.

9. The method in claim 5, further comprising:
    from back scatter data in the waveguide, generating a set of reflectivity numbers as a function of frequency for two polarization modes associated with light back scattered from the waveguide;
    calculating a Fourier transform of the set of complex reflectivity numbers;
    extracting two arrays of complex data associated with two polarizations of the segment from the set of complex reflectivity numbers;

calculating a Fourier transform of the two complex data arrays;

calculating an amplitude of a complex number at each point in the two arrays;

calculating a vector sum of the two amplitudes for each point in the two arrays to form a single amplitude spectrum;

removing a mean from the amplitude spectrum;

autocorrelating the amplitude spectrum;

determining a distance from a center spectral peak to a first side peak in the autocorreation; and calculating the birefringence of the segment based on the determined distance.

10. The method in claim 1, further comprising:
using Optical Low Coherence Reflectometry (OLCR) to obtain the back scatter data, and
storing the back scatter data in memory.

11. The method in claim 1, wherein the birefringence is determined without using a Bragg grating.

12. The method in claim 1, wherein the waveguide is an optical fiber.

13. The method in claim 1, wherein the birefringence is used to detect a temperature or a strain associated with the waveguide segment.

14. The method in claim 1, wherein the autocorrelation of the back scatter data is performed in the spectral or frequency domain.

15. The method in claim 1, wherein the waveguide is highly birefringent and the segment of the waveguide is more that 20 cm from the beginning of the highly birefringent waveguide.

16. Optical apparatus, comprising:
a light source for coupling light into plural polarization modes of a waveguide so that the light propagates along the plural polarization modes of the waveguide;
optical detection circuitry configured to detect scatter reflections associated with a segment of the waveguide and generate back scatter data associated with the detected scatter reflections, and
processing circuitry configured to:
computing an autocorrelation of the back scatter data, and
determine a birefringence of the waveguide segment at a particular location along the waveguide based on the computed autocorrelation.

17. The apparatus in claim 16, wherein the apparatus includes an Optical Frequency Domain Reflectometry (OFDR) instrument.

18. The apparatus in claim 16, wherein the processing circuitry is configured to:
determine a distance from a main peak of the autocorrelation and a side peak of the autocorrelation, and
wherein the side peak of the autocorrelation corresponds to one of plural polarization modes associated with light back scattered from the waveguide segment.

19. The apparatus in claim 18, wherein the distance corresponds to a beat length of the waveguide segment, and wherein the processing circuitry is configured to determine the birefringence based on the beat length.

20. The apparatus in claim 16, further comprising:
a tunable laser for scanning the waveguide,
wherein light from the laser is reflected as a result of Rayleigh scattering in the waveguide and corresponds to the scatter reflections.

21. The apparatus in claim 20, wherein the processing circuitry is configured to linearize the back scatter data to compensate for non-linearity in the scanning.

22. The apparatus in claim 20, further comprising:
a polarization beam splitter, and
plural polarization back scatter intensity detectors.

23. The apparatus in claim 20, wherein the apparatus is an OFDR without a polarization beam splitter.

24. The apparatus in claim 20, the processing circuitry is configured to:
from back scatter data in the waveguide, generate a set of reflectivity numbers as a function of frequency for two polarization modes associated with light back scattered from the waveguide;
calculate a Fourier transform of the set of reflectivity numbers;
extract two arrays of complex data associated with two polarizations of the segment from the set of complex reflectivity numbers;
calculate a Fourier transform of the two complex data arrays;
calculate an amplitude of a complex number at each point in the two arrays;
calculate a vector sum of the two amplitudes for each point in the two arrays to form a single amplitude spectrum;
remove a mean from the amplitude spectrum;
autocorrelate the amplitude spectrum;
determine a distance from a center spectral peak to a first side peak in the autocorreation; and
calculate the birefringence of the segment based on the determined distance.

25. The apparatus in claim 16, wherein the apparatus includes an Optical Low Coherence Reflectometry (OLCR) instrument.

26. The apparatus in claim 16, wherein the apparatus is arranged to
determine the birefringence without using a Bragg grating.

27. The apparatus in claim 16, wherein the waveguide is an optical fiber.

28. The apparatus in claim 16, wherein the apparatus is configured to detect a temperature or a strain associated with the waveguide segment using the determined birefringence.

29. The apparatus in claim 16, wherein the autocorrelation of the back scatter data is performed in the spectral or frequency domain.

30. The apparatus in claim 16, wherein the waveguide is highly birefringent and the segment of the waveguide is more than 20 cm from the beginning of the highly birefringent waveguide.

* * * * *